US012520089B2

(12) United States Patent
Van den Heuvel

(10) Patent No.: US 12,520,089 B2
(45) Date of Patent: Jan. 6, 2026

(54) MEDICAL IMPLANT ACTUATOR WITH MASS CONFIGURED TO MITIGATE EDDY CURRENTS

(71) Applicant: Cochlear Limited, Macquarie University (AU)

(72) Inventor: Koen Erik Van den Heuvel, Mechelen (BE)

(73) Assignee: Cochlear Limited, Macquarie University (AU)

( * ) Notice: Subject to any disclaimer, the term of this patent is extended or adjusted under 35 U.S.C. 154(b) by 306 days.

(21) Appl. No.: 18/257,832

(22) PCT Filed: Jan. 3, 2022

(86) PCT No.: PCT/IB2022/050029
§ 371 (c)(1),
(2) Date: Jun. 15, 2023

(87) PCT Pub. No.: WO2022/162476
PCT Pub. Date: Aug. 4, 2022

(65) Prior Publication Data
US 2024/0114303 A1 Apr. 4, 2024

Related U.S. Application Data

(60) Provisional application No. 63/141,622, filed on Jan. 26, 2021.

(51) Int. Cl.
*H04R 25/00* (2006.01)

(52) U.S. Cl.
CPC ......... *H04R 25/606* (2013.01); *H04R 25/554* (2013.01); *H04R 25/609* (2019.05);
(Continued)

(58) Field of Classification Search
CPC ............... H04R 17/00; H04R 2225/67; H04R 2225/77; H04R 2460/13; H04R 25/554; H04R 25/606; H04R 25/609
(Continued)

(56) References Cited

U.S. PATENT DOCUMENTS 9,716,953 B2 * 7/2017 Andersson ........... H04R 25/606
2017/0086002 A1 3/2017 Nagl et al.
(Continued)

OTHER PUBLICATIONS

Written Opinion and International Search Report of International Application No. PCT/IB2022/050029 dated Apr. 5, 2022 in 9 pages.

*Primary Examiner* — Phylesha Dabney
(74) *Attorney, Agent, or Firm* — Knobbe, Martens Olson & Bear, LLP

(57) ABSTRACT

An apparatus includes a housing configured to be implanted beneath a portion of skin of a recipient and first circuitry within the housing. The first circuitry is configured to wirelessly communicate with second circuitry of an external device positioned on or above the portion of skin. The apparatus further includes an actuator within the housing and configured to be in mechanical communication with a portion of bone of the recipient. The actuator includes a unitary mass configured to undergo vibratory motion within the housing. The unitary mass includes a plurality of electrically conductive sub-masses in mechanical communication with one another and electrically isolated from one another.

20 Claims, 7 Drawing Sheets

(52) U.S. Cl.
CPC ...... *H04R 2225/67* (2013.01); *H04R 2225/77* (2013.01); *H04R 2460/13* (2013.01)

(58) Field of Classification Search
USPC .......................................................... 381/312
See application file for complete search history.

(56) References Cited

U.S. PATENT DOCUMENTS

| | | | |
|---|---|---|---|
| 2017/0094429 | A1 | 3/2017 | Bervoets et al. |
| 2017/0156010 | A1 | 6/2017 | Verma et al. |
| 2017/0325035 | A1 | 11/2017 | Andersson et al. |
| 2018/0020299 | A1 | 1/2018 | Nilsson |

* cited by examiner

MEDICAL IMPLANT ACTUATOR WITH MASS CONFIGURED TO MITIGATE EDDY CURRENTS

BACKGROUND

Field

The present application relates generally to an implantable actuator for generating vibrations, and more specifically, to implantable auditory prostheses for generating auditory vibrations.

Description of the Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect disclosed herein, an apparatus comprises a housing configured to be implanted beneath a portion of skin of a recipient. The apparatus further comprises first circuitry within the housing, the first circuitry configured to wirelessly communicate with second circuitry of an external device positioned on or above the portion of skin. The apparatus further comprises an actuator within the housing and configured to be in mechanical communication with a portion of bone of the recipient. The actuator comprises a unitary mass configured to undergo vibratory motion within the housing. The unitary mass comprises a plurality of electrically conductive sub-masses in mechanical communication with one another and electrically isolated from one another.

In another aspect disclosed herein, an assembly comprises an external device configured to be positioned outside a recipient's body, the external device comprising a first communication coil. The assembly further comprises an implantable device configured to be implanted on or within the recipient's body. The implantable device comprises a second communication coil in inductive communication with the first communication coil with an inductive link efficiency therebetween. The implantable device further comprises a monolithic, electrically partitioned mass within a region between the first communication coil and the second communication coil and/or bounded at least in part by the second communication coil. The monolithic, electrically partitioned mass comprises at least one electrically insulating material and a plurality of portions comprising an electrically conductive material. The portions are electrically insulated from one another by the at least one electrically insulating material.

In another aspect disclosed herein, a method comprises providing a unitary mass comprising a plurality of electrically conductive sections that are electrically isolated from one another. The method further comprises affixing the unitary mass to an actuator of a first device configured to be implanted on or within a recipient's body. The first device comprises first circuitry configured to communicate via a magnetic induction link with second circuitry of a second device configured to be positioned outside the recipient's body. The method further comprises positioning the unitary mass, the actuator, and the first circuitry such that a first electrical current flowing within the first circuitry generates a magnetic flux configured to magnetically induce a second electrical current to flow within the second circuitry, the magnetic flux extending through at least a portion of the unitary mass.

BRIEF DESCRIPTION OF THE DRAWINGS

Implementations are described herein in conjunction with the accompanying drawings, in which.

DETAILED DESCRIPTION

Certain implementations described herein provide an implantable active transcutaneous bone conduction device having an RF communication coil and a piezoelectric actuator in which the vibrating mass is close to (e.g., within a region bounded by) the RF communication coil. The vibrating mass comprises a plurality of electrically conductive portions affixed to and electrically isolated from one another by an electrically insulating material. The electrically conductive portions and the electrically insulating material of the vibrating mass are configured to mitigate the formation of eddy currents within the vibrating mass caused by the magnetic flux generated and/or received by the RF communication coil. Such eddy currents can adversely affect the RF coupling link efficiency of the device, and mitigation of the eddy currents can allow the vibrating mass to be positioned closer to the RF communication coil for a smaller form-factor active transcutaneous bone conduction device, and/or can provide improved communication performance and/or battery life.

The teachings detailed herein are applicable, in at least some implementations, to any type of implantable medical device (e g, implantable stimulation system) comprising a first portion implanted on or within the recipient's body and configured to provide vibrations to a portion of the recipient's body Implementations can include any type of medical device that can utilize the teachings detailed herein and/or variations thereof. Furthermore, while certain implementations are described herein in the context of implantable devices, certain other implementations are compatible in the context of non-implantable devices. For example, low resonant frequency within a smaller form-factor and greater customization of the actuation dynamics can be provided, at least in part, by at least one non-planar piezoelectric element in a non-implantable device.

Merely for ease of description, apparatus and methods disclosed herein are primarily described with reference to an illustrative medical device, namely an active transcutaneous bone conduction auditory prosthesis. However, the teachings detailed herein and/or variations thereof may also be used with a variety of other medical devices that provide a wide range of therapeutic benefits to recipients, patients, or other users. In some implementations, the teachings detailed herein and/or variations thereof can be utilized in other types of devices beyond auditory prostheses that may benefit from a vibration-generating actuator able to fit within a region having restricted space and/or improved control of piezoelectric vibrations (e.g., a direction of vibration motion). For example, apparatus and methods disclosed herein and/or variations thereof may also be used with control sensors configured to measure liquid levels.

Figure 1A:
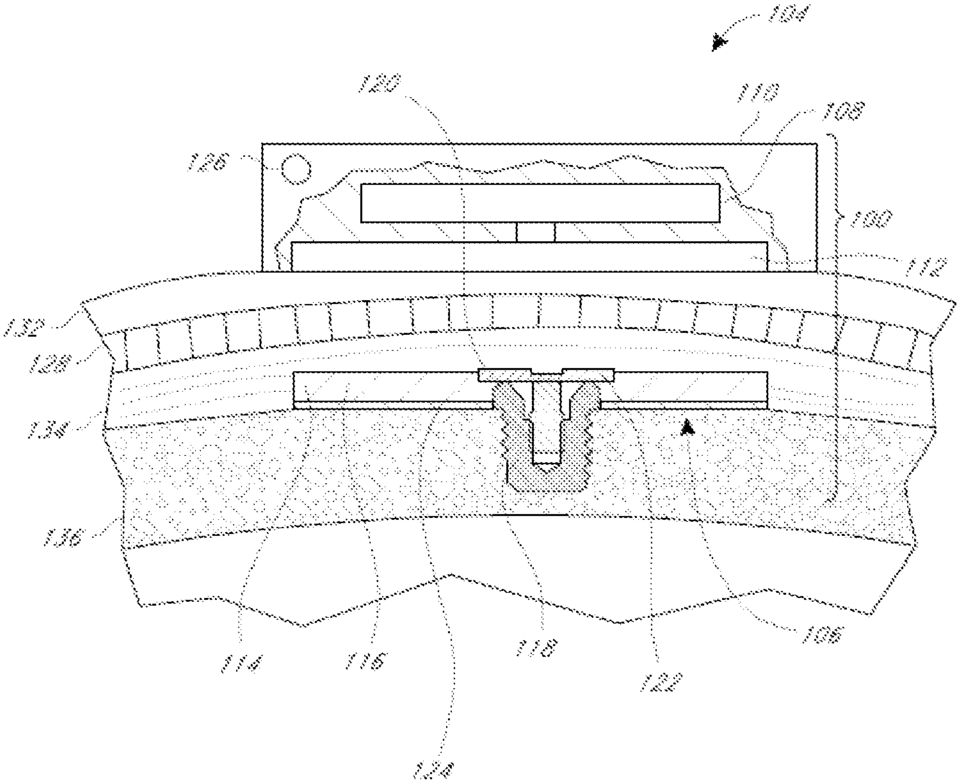
FIG. 1A schematically illustrates a portion of an example transcutaneous bone conduction device implanted in a recipient in accordance with certain implementations described herein.
Figure 1B:
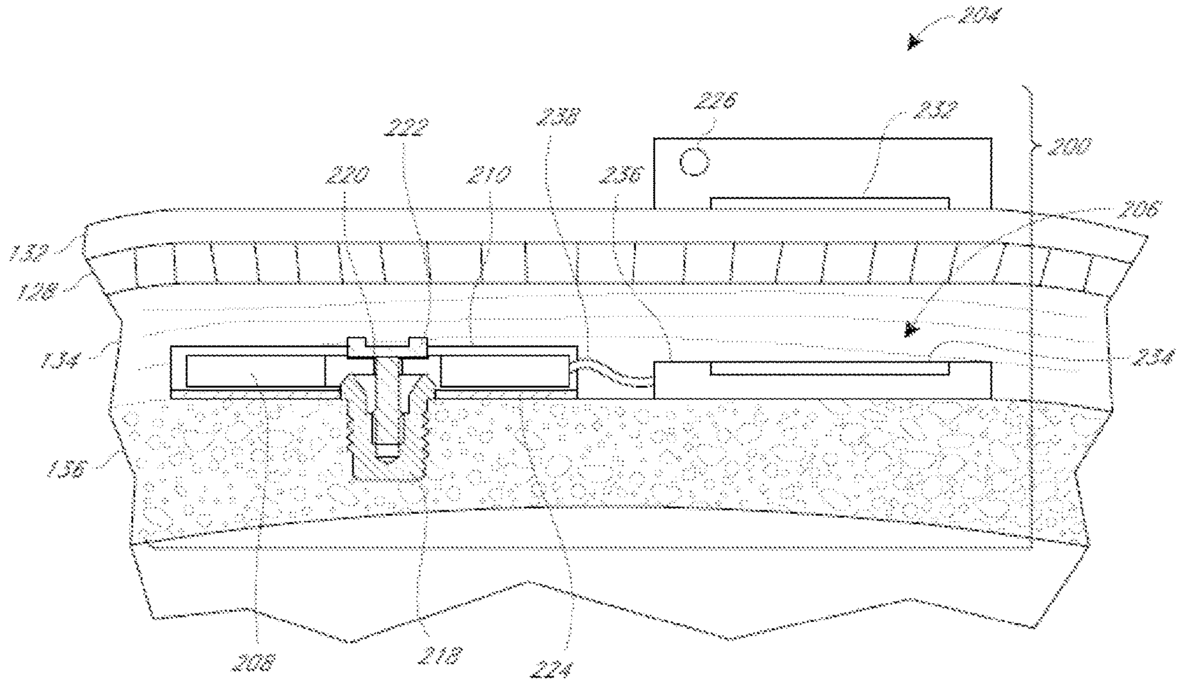
FIG. 1B schematically illustrate a portion of another example transcutaneous bone conduction device implanted in a recipient in accordance with certain implementations described herein.

FIG. 1A schematically illustrates a portion of an example transcutaneous bone conduction device 100 implanted in a recipient in accordance with certain implementations described herein. FIG. 1B schematically illustrate a portion of another example transcutaneous bone conduction device 200 implanted in a recipient in accordance with certain implementations described herein.

The example transcutaneous bone conduction device 100 of FIG. 1A includes an external device 104 and an implantable component 106. The transcutaneous bone conduction device 100 of FIG. 1A is a passive transcutaneous bone conduction device in that a vibrating actuator 108 is located in the external device 104 and delivers vibrational stimuli through the skin 132 to the skull 136. The vibrating actuator 108 is located in a housing 110 of the external component 104 and is coupled to a plate 112. The plate 112 can be in the form of a permanent magnet and/or in another form that generates and/or is reactive to a magnetic field, or otherwise permits the establishment of magnetic attraction between the external device 104 and the implantable component 106 sufficient to hold the external device 104 against the skin 132 of the recipient.

In certain implementations, the vibrating actuator 108 is a device that converts electrical signals into vibration. In operation, a sound input element 126 can convert sound into electrical signals. Specifically, the transcutaneous bone conduction device 100 can provide these electrical signals to the vibrating actuator 108, or to a sound processor (not shown) that processes the electrical signals, and then provides those processed signals to the vibrating actuator 108. The vibrating actuator 108 can convert the electrical signals (processed or unprocessed) into vibrations. Because the vibrating actuator 108 is mechanically coupled to the plate 112, the vibrations are transferred from the vibrating actuator 108 to the plate 112. The implanted plate assembly 114 is part of the implantable component 106, and is made of a ferromagnetic material that may be in the form of a permanent magnet, that generates and/or is reactive to a magnetic field, or otherwise permits the establishment of a magnetic attraction between the external device 104 and the implantable component 106 sufficient to hold the external device 104 against the skin 132 of the recipient. Accordingly, vibrations produced by the vibrating actuator 108 of the external device 104 are transferred from the plate 112 across the skin 132 to a plate 116 of the plate assembly 114. This can be accomplished as a result of mechanical conduction of the vibrations through the skin 132, resulting from the external device 104 being in direct contact with the skin 132 and/or from the magnetic field between the two plates 112, 116. These vibrations are transferred without a component penetrating the skin 132, fat 128, or muscular 134 layers on the head.

In certain implementations, the implanted plate assembly 114 is substantially rigidly attached to a bone fixture 118. The implantable plate assembly 114 can include a through hole 120 that is contoured to the outer contours of the bone fixture 118. This through hole 120 thus forms a bone fixture interface section that is contoured to the exposed section of the bone fixture 118. In certain implementations, the sections are sized and dimensioned such that at least a slip fit or an interference fit exists with respect to the sections. A screw 122 can be used to secure the plate assembly 114 to the bone fixture 118. In certain implementations, a silicone layer 124 is located between the plate 116 and the bone 136 of the skull.

As can be seen in FIG. 1A, the head of the screw 122 is larger than the hole through the implantable plate assembly 114, and thus the screw 122 positively retains the implantable plate assembly 114 to the bone fixture 118. The portions of the screw 122 that interface with the bone fixture 118 substantially correspond to an abutment screw, thus permitting the screw 122 to readily fit into an existing bone fixture used in a percutaneous bone conduction device. In certain implementations, the screw 122 is configured so that the same tools and procedures that are used to install and/or remove an abutment screw from the bone fixture 118 can be used to install and/or remove the screw 122 from the bone fixture 118.

As schematically illustrated by FIG. 1B, an example transcutaneous bone conduction device 200 comprises an external device 204 and an implantable component 206. The device 200 is an active transcutaneous bone conduction device in that the vibrating actuator 208 is located in the implantable component 206. For example, a vibratory element in the form of a vibrating actuator 208 is located in a housing 210 of the implantable component 206. In certain implementations, much like the vibrating actuator 108 described herein with respect to the transcutaneous bone conduction device 100, the vibrating actuator 208 is a device that converts electrical signals into vibration. The vibrating actuator 208 can be in direct contact with the outer surface of the recipient's skull 136 (e.g., the vibrating actuator 208 is in substantial contact with the recipient's bone 136 such that vibration forces from the vibrating actuator 208 are communicated from the vibrating actuator 208 to the recipient's bone 136). In certain implementations, there can be one or more thin non-bone tissue layers (e.g., a silicone layer 224) between the vibrating actuator 208 and the recipient's bone 136 (e.g., bone tissue) while still permitting sufficient support so as to allow efficient communication of the vibration forces generated by the vibrating actuator 208 to the recipient's bone 136.

In certain implementations, the external component 204 includes a sound input element 226 that converts sound into electrical signals. Specifically, the device 200 provides these electrical signals to the vibrating actuator 208, or to a sound processor (not shown) that processes the electrical signals, and then provides those processed signals to the implantable component 206 through the skin of the recipient via a magnetic inductance link. For example, a communication coil 232 of the external component 204 can transmit these signals to an implanted communication coil 234 located in a housing 236 of the implantable component 206. Components (not shown) in the housing 236, such as, for example, a signal generator or an implanted sound processor, then generate electrical signals to be delivered to the vibrating actuator 208 via electrical lead assembly 238. The vibrating actuator 208 converts the electrical signals into vibrations. In certain implementations, the vibrating actuator 208 can be positioned with such proximity to the housing 236 that the electrical leads 238 are not present (e.g., the housing 210 and the housing 236 are the same single housing containing the vibrating actuator 208, the communication coil 234, and other components, such as, for example, a signal generator or a sound processor).

In certain implementations, the vibrating actuator 208 is mechanically coupled to the housing 210. The housing 210 and the vibrating actuator 208 collectively form a vibrating element. The housing 210 can be substantially rigidly attached to a bone fixture 218. In this regard, the housing 210 can include a through hole 220 that is contoured to the outer contours of the bone fixture 218. The screw 222 can be used to secure the housing 210 to the bone fixture 218. As can be seen in FIG. 1B, the head of the screw 222 is larger than the through hole 220 of the housing 210, and thus the screw 222 positively retains the housing 210 to the bone fixture 218. The portions of the screw 222 that interface with the bone fixture 218 substantially correspond to the abutment screw detailed below, thus permitting the screw 222 to readily fit into an existing bone fixture used in a percutaneous bone conduction device (or an existing passive bone conduction device). In certain implementations, the screw 222 is configured so that the same tools and procedures that are used to install and/or remove an abutment screw from the bone fixture 218 can be used to install and/or remove the screw 222 from the bone fixture 218.

The example transcutaneous bone conduction auditory device 100 of FIG. 1A comprises an external sound input element 126 (e.g., external microphone) and the example transcutaneous bone conduction auditory device 200 of FIG. 1B comprises an external sound input element 226 (e.g., external microphone). Other example auditory devices (e.g., totally implantable transcutaneous bone conduction devices) in accordance with certain implementations described herein can replace the external sound input element 126, 226 with a subcutaneously implantable sound input assembly (e.g., implanted microphone).

Figure 2A:
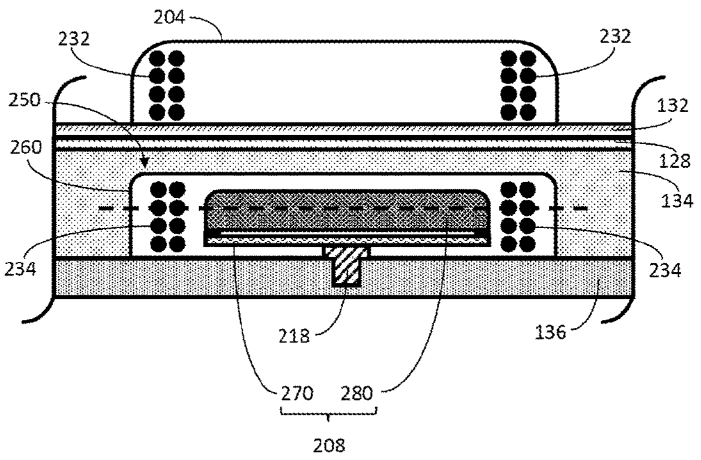
FIGS. 2A-2B schematically illustrate cross-sectional views of a portion of an example transcutaneous bone conduction device comprising at least one actuator configured to generate vibrations.
Figure 2B:
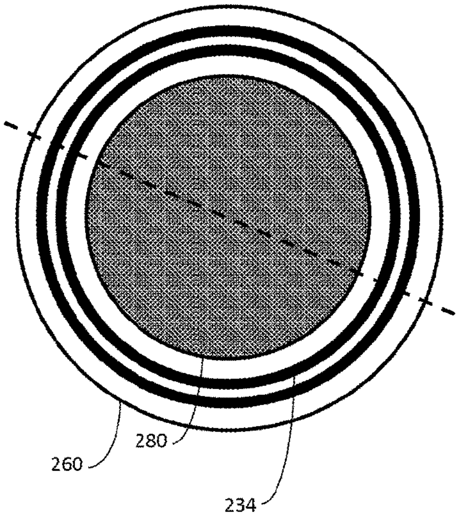

FIGS. 2A-2B schematically illustrate a side cross-sectional view and a top cross-sectional view, respectively, of another example active transcutaneous bone conduction device 250. The dashed line of FIG. 2A shows the plane of the cross-sectional view of FIG. 2B and the dashed line of FIG. 2B shows the plane of the cross-sectional view of FIG. 2A. While the example active transcutaneous bone conduction device 200 of FIG. 1B has an implantable component 206 having two implantable housings 210, 236 spaced apart from one another, with the implantable housing 210 containing the vibrating actuator 208 and the implantable housing 236 containing the communication coil 234, the example active transcutaneous bone conduction device 250 of FIG. 2A-2B has a single implantable housing 260 containing both the vibrating actuator 208 and the communication coil 234. The housing 260 is positioned below the communication coil 232 of the external device 204 such that the two communication coils 232, 234 can transmit power and/or communication signals between one another via magnetic induction. The vibrating actuator 208 of FIGS. 2A-2B is in mechanical communication with the bone fixture 218 and comprises a piezoelectric element 270 (e.g., multilayer structure comprising at least one piezoelectric material) and a unitary mass 280 (e.g., monolithic, non-electrically partitioned mass) in mechanical communication with the piezoelectric element 270. The piezoelectric element 270 is configured to respond to oscillating electrical signals applied to the piezoelectric element 270 (e.g., from circuitry within the housing 260) by vibrating (e.g., bending) such that the unitary mass 280 undergoes vibratory motion within the housing 260 and the actuator 208 transmits the resultant vibrations to the bone fixture 218.

The unitary mass 280 of FIGS. 2A-2B can comprise an electrically conductive metal (e.g., tungsten) that has a sufficiently high mass density such that the actuator 208 has a predetermined resonant frequency. Since the unitary mass 280 of the actuator 208 of FIGS. 2A-2B is positioned within a volume at least partially bounded by the communication coil 234, the time-varying magnetic fluxes generated by the communication coils 232, 234 extend through the unitary mass 280 and can generate eddy currents flowing within the electrically conductive material of the unitary mass 280. The generation of these eddy currents can reduce (e.g., degrade) the coupling coefficient (e.g., RF link efficiency) between the communication coils 232, 234, with the reduction proportional to the area bounded by the eddy current.

Figure 3A:
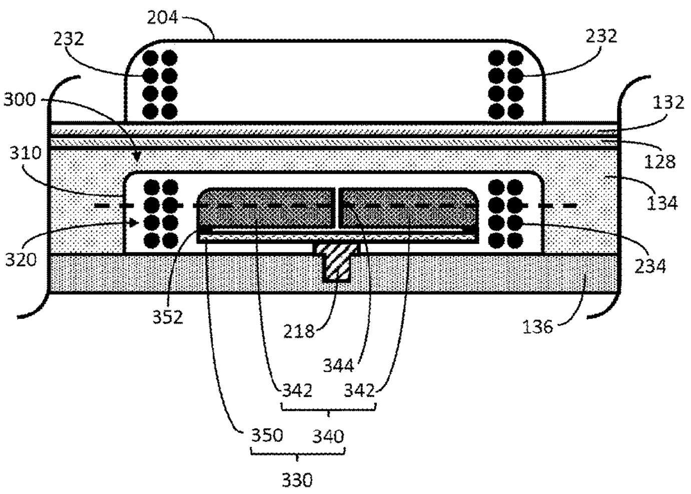
FIGS. 3A-3B schematically illustrate cross-sectional views of a portion of an example apparatus comprising at least one actuator configured to generate vibrations in accordance with certain implementations described herein.
Figure 3B:
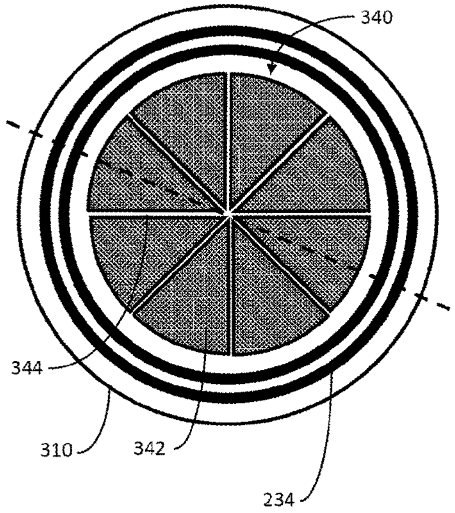

FIGS. 3A-3B schematically illustrate a side cross-sectional view and a top cross-sectional view, respectively, of an example apparatus 300 (e.g., an active transcutaneous bone conduction device) in accordance with certain implementations described herein. The dashed line of FIG. 3A shows the plane of the cross-sectional view of FIG. 3B and the dashed line of FIG. 3B shows the plane of the cross-sectional view of FIG. 3A. In certain implementations, the apparatus 300 is configured to be implanted on or within the recipient's body. For example, as schematically illustrated by FIG. 3A, the apparatus 300 can comprise an implant configured to be mechanically attached to a fixture implanted into or onto a portion of the recipient's bone (e.g., an osseointegrated bone fixture 218) and configured to transmit vibrations generated by the apparatus 300 to the recipient's body such that the vibrations evoke a hearing precept by the recipient (e.g., to mechanically vibrate the skull bone of the recipient, the vibrations received by the recipient's cochlea to compensate for conductive hearing loss, mixed hearing loss, or single-sided deafness).

The example apparatus 300 of FIGS. 3A-3B comprises a housing 310 configured to be implanted beneath a portion of skin 132 of a recipient (e.g., beneath the skin 132, fat 128, and muscular 134 layers of the recipient). The apparatus 300 further comprises first circuitry 320 (e.g., comprising communication coil 234) within the housing 310, the first circuitry 320 configured to wirelessly communicate with second circuitry (e.g., comprising communication coil 232) of an external device 204 positioned on or above the portion of skin 132. The apparatus 300 further comprises an actuator 330 within the housing 310 and configured to be in mechanical communication with a portion of bone 136 of the recipient. For example, the actuator 330 can be in mechanical communication with a bone fixture 218 in mechanical communication (e.g., osseointegrated) with the bone 136 (e.g., skull) of the recipient. The actuator 330 comprises a unitary mass 340 configured to undergo vibratory motion within the housing 310. The unitary mass 340 comprises a plurality of electrically conductive sub-masses 342 in mechanical communication with one another and electrically isolated from one another (e.g., the unitary mass 340 is a monolithic, electrically partitioned mass).

In certain implementations, the housing 310 is configured to hermetically seal the actuator 320 from an environment surrounding the at least one actuator 310. The housing 310 can have a length and/or a width less than or equal to 40 millimeters (e.g., in a range of 15 millimeters to 35 millimeters; in a range of 25 millimeters to 35 millimeters; in a range off less than 30 millimeters; in a range of 15 millimeters to 30 millimeters), and/or a thickness less than or equal to 7 millimeters (e.g., in a range of less than or equal to 6 millimeters, in a range of less than or equal to 5 millimeters; in a range of less than or equal to 4 millimeters). The housing 310 of certain implementations comprises at least one biocompatible material that is substantially transparent to the electromagnetic fields generated by one or both of the communication coils 232, 234 such that the housing 310 does not substantially interfere with the transmission of power and/or communication signals via magnetic induction between the apparatus 300 and the external device 204 (e.g., an external sound processor of a hearing prosthesis). For example, the material of the housing 310 can comprise plastic (e.g., PEEK), silicone, or ceramic (e.g., zirconium oxide). In certain implementations, the housing 310 is configured to provide vibrational isolation such that the bone fixture 218 is substantially the only pathway through which vibrations travel from the actuator 320 to the recipient's body. For example, the housing 310 can be substantially rigidly attached to the bone fixture 218 (e.g., by a screw extending through a hole of the housing that is contoured to the outer contours of the bone fixture 218). In certain implementations, the housing 310 can comprise one or more thin silicone layers (not shown) between the actuator 330 and the underlying portion of the recipient's bone 136 to support the housing 310 such that the bone fixture 218 is the primary conduit for transmission of the vibrations generated by the actuator 330 to the recipient's bone 136.

In certain implementations, the first circuitry 320 is configured to wirelessly communicate with the second circuitry (e.g., communication coil 232) of the external device 204 positioned on or above the portion of skin 132. For example, the first circuitry 320 can comprise a communication coil 234 having a plurality of coil turns configured to generate a time-varying magnetic flux in response to a time-varying electric current flowing through the communication coil 234, the magnetic flux extending through an area bounded by the communication coil 232 of the external device 204. In addition, the communication coil 234 can bound an area through which a time-varying magnetic flux generated by the communication coil 232 extends, the communication coil 234 responsive to the magnetic flux by generating an electrical current flowing through the communication coil 234. The communication coil 234 can have any shape (e.g., circular, oval, rectangular, geometric, non-geometric, planar, non-planar).

In certain implementations, the actuator 330 is configured to generate vibrations in response to electrical signals. For example, the actuator 330 can be a piezoelectric actuator comprising the unitary mass 340 and at least one piezoelectric element 350 (e.g., multilayer structure comprising at least one piezoelectric material) in mechanical communication with the unitary mass 340 (e.g., via a clamp, screw, adhesive, or other coupler) and in mechanical communication with the bone fixture 218 (e.g., via a clamp, screw, adhesive, or other coupler). The at least one piezoelectric element 350 can be configured to vibrate (e.g., changing shape and/or dimensions; bending back and forth; elongating and contracting) in response to received time-varying electric voltage signals (e.g., from the first circuitry 320 within the housing 310 or other circuitry within the housing 310) to impart a vibratory (e.g., oscillatory) motion to the unitary mass 340 within the housing 310. The resultant vibrations are transmitted to the recipient's body (e.g., via the bone fixture 218).

In certain implementations, the at least one piezoelectric element 350 is a unitary (e.g., single; monolithic) component comprising at least one piezoelectric material, while in certain other implementations, the at least one piezoelectric element 350 comprises separate components, one or more of which each comprising at least one piezoelectric material. Examples of piezoelectric materials compatible with certain implementations described herein include, but are not limited to: quartz; gallium orthophosphate; langasite; barium titanate; lead titanate; lead zirconate titanate; potassium niobate; lithium niobate; lithium tantalate; sodium tungstate; sodium potassium niobate; bismuth ferrite; sodium niobate; polyvinylidene fluoride; other piezoelectric crystals, ceramics, or polymers. The at least one piezoelectric element 350 of certain implementations comprises two or more layers in mechanical communication with one another (e.g., bonded together) into a unitary component, at least one of the layers comprising at least one piezoelectric material. The unitary component can comprise other non-piezoelectric materials, such as a bonding material (e.g., adhesive; epoxy; metal) between the piezoelectric layers and/or electrically conductive material (e.g., metal) configured to apply electrical voltage signals to the piezoelectric layers.

In certain implementations, the at least one piezoelectric element 350 comprises a unitary sheet (e.g., plate; disc-shaped) having a center portion in mechanically communication with the bone fixture 218. The sheet can have a length and/or a width (perpendicular to the length) less than or equal to 30 millimeters (e.g., in a range of 10 millimeters to 25 millimeters; in a range of 15 millimeters to 25 millimeters; in a range of less than 25 millimeters; in a range of 10 millimeters to 25 millimeters), and/or a thickness (perpendicular to the width and the length) and in a range of less than 2 millimeters (e.g., in a range of less than 1 millimeter; in a range of 0.25 millimeter to 0.75 millimeter). In certain implementations, the natural frequency of the piezoelectric element 350 is in a range of 250 Hz to 8 kHz (e.g., the non-planar piezoelectric element 350 is configured to vibrate, in response to electrical voltage signals, at a frequency in a range of 250 Hz to 8 kHz). In certain implementations, the at least one piezoelectric element 350 is affixed to the unitary mass 340. For example, at least one end portion of the at least one piezoelectric element 350 can be affixed (e.g., by adhesive 352) to at least one perimeter portion of the unitary mass 340, as schematically illustrated by FIG. 3A.

In certain implementations, the unitary mass 340 has a mass (e.g., weight) configured to achieve a predetermined resonant frequency and to vibrate within the confines of the housing 310 without being encumbered by the housing 310. The unitary mass 340 can have a length and/or a width less than or equal to 30 millimeters (e.g., in a range of 10 millimeters to 25 millimeters; in a range of 15 millimeters to 25 millimeters; in a range of less than 25 millimeters; in a range of 10 millimeters to 25 millimeters), and/or a thickness less than or equal to 5 millimeters (e.g., in a range of 2 millimeters to 3.5 millimeters). As schematically illustrated by FIGS. 3A-3B, the unitary mass 340 can have a substantially planar and circular shape (e.g., disk-shaped). Various other shapes of the unitary mass 340 are also compatible with certain implementations described herein, including but not limited to, oval; square; rectangular; triangular; polygonal with 5, 6, 7, 8, or more sides; regular; irregular; geometric; non-geometric; non-planar.

In certain implementations, the plurality of electrically conductive sub-masses 342 of the unitary mass 340 are in mechanical communication with one another and electrically isolated from one another. For example, the electrically conductive sub-masses 342 can comprise at least one metallic material (e.g., tungsten; tungsten alloy; osmium; osmium alloy) and the unitary mass 340 can further comprise at least one electrically insulative material 344 (e.g., adhesive; epoxy; double-sided tape; glue) that affixes the sub-masses 342 to one another and that separates and electrically isolates two or more of the sub-masses 342 from one another. In certain implementations, two or more of the sub-masses 342 (e.g., all the sub-masses 342) have substantially equal shapes, dimensions (e.g., length; width; thickness; volume), and/or masses (e.g., weights) as one another. For example, as schematically illustrated by FIGS. 3A-3B, the substantially circular unitary mass 340 comprises eight sector-shaped (e.g., wedge-shaped) sub-masses 342 comprising the same material, dimensions, and weight as one another and held together without touching one another (e.g., by epoxy). In certain implementations, at least two of the sub-masses 342 have substantially different shapes, dimensions, and/or masses from one another and are distributed such that the unitary mass 340 is sufficiently mass-balanced to provide a predetermined vibrational response to movement of the at least one piezoelectric element 350. Other shapes of the sub-masses 342 are also compatible with certain implementations described herein, including but not limited to: square; rectangular; triangular; circular; spherical; honeycomb; polygonal with 5, 6, 7, 8, or more sides; regular; irregular; geometric; non-geometric.

In certain implementations, at least some of the sub-masses 342 (e.g., all of the sub-masses 342) are positioned relative to the first circuitry 320 (e.g., communication coil 234) and/or the second circuitry (e.g., communication coil 232) such that a time-varying magnetic flux generated by the first circuitry 320 and/or the second circuitry extends through the sub-masses 342 and generates electrical eddy currents in the sub-masses 342. For example, as schematically illustrated by FIGS. 3A-3B, all the sub-masses 342 of the unitary mass 340 are positioned within a region at least partially bounded (e.g., encircled) by the communication coil 234 of the first circuitry 320. Other positions of the sub-masses 342 (e.g., outside a region encircled by the communication coil 234) are also compatible with certain implementations described herein.

In certain implementations, adjacent sub-masses 342 (e.g., two sub-masses 342 next to one another without another sub-mass 342 between the two) are separated from one another by less than 5 millimeters (e.g., less than 3 millimeters; less than 2 millimeters; less than 1 millimeter). The electrically insulative material 344 of certain such implementations is sufficiently thick such that electrical eddy currents do not flow between adjacent sub-masses 342. Each eddy current generated within the sub-masses 342 is constrained to flow within the boundaries of the single sub-mass 342 in which the eddy current is generated (e.g., none of the eddy currents flow through a region larger than the sub-masses 342). As a result, the size of the sub-mass 342 in which an eddy current flows constrains (e.g., limits) the area bounded by the eddy current. The smaller sub-masses 342 of the unitary mass 340 of certain implementations described herein (see, e.g., FIGS. 3A-3B as compared to the mass 280 of FIGS. 2A-2B) thereby reduce (e.g., prevent) degradation by the eddy currents on the coupling coefficient (e.g., RF link efficiency) between the communication coils 232, 234. For example, the degradation of the inductive RF link efficiency due to the eddy currents generated within the monolithic, electrically partitioned unitary mass 340 by the inductive communication is less than an expected degradation of the inductive RF link efficiency due to the eddy currents expected to be generated by the inductive communication within a monolithic, non-electrically partitioned unitary mass 280 having an identical shape, volume, position, and electrically conductive material as the monolithic, electrically partitioned unitary mass 340.

Figure 4A:
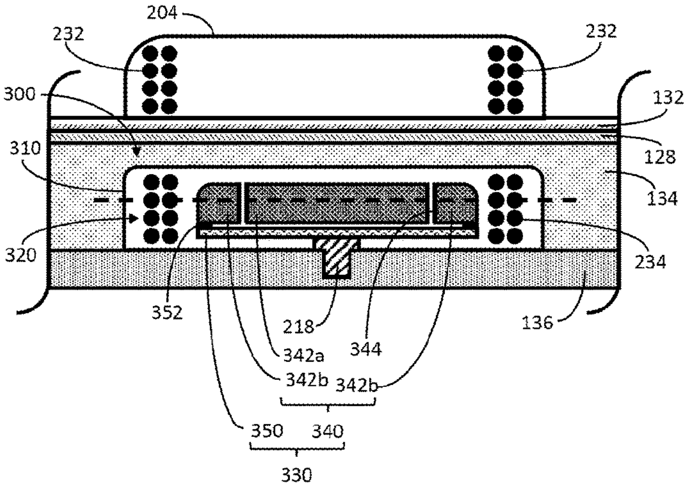
FIGS. 4A-4B schematically illustrate cross-sectional views of a portion of another example apparatus comprising at least one actuator configured to generate vibrations in accordance with certain implementations described herein.
Figure 4B:
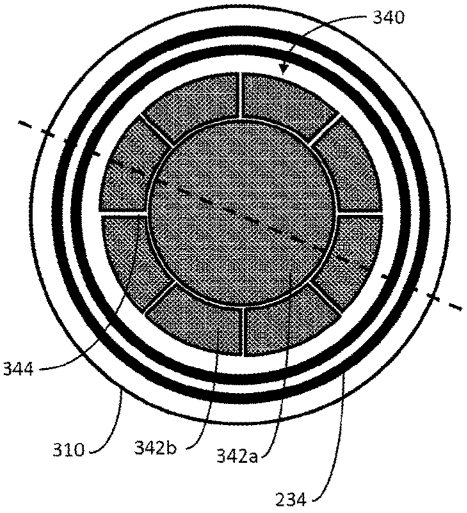

In certain implementations, the time-varying magnetic flux extending through the unitary mass 340 is not spatially uniform throughout the unitary mass 340, and the sub-masses 342 can be configured to reduce (e.g., limit) only a corresponding portion of the eddy currents within the unitary mass 340. For example, FIGS. 4A-4B schematically illustrate a side cross-sectional view and a top cross-sectional view, respectively, of another example apparatus 300 in accordance with certain implementations described herein. For the configuration of the communication coils 232, 234 of FIGS. 4A-4B (e.g., substantially planar and circular communication coils 232, 234 that are substantially parallel and substantially concentric with one another and that are displaced from one another along a direction substantially perpendicular to the communication coils 232, 234), the magnetic flux extending through the region bounded (e.g., encircled) by the communication coil 234 has a larger magnitude in a peripheral portion of the region than in a center portion of the region (e.g., the magnetic flux is larger closer to the wires of the communication coil 234). As a result, the eddy currents generated in the peripheral portion of the unitary mass 280 have larger magnitudes and bound larger areas than the eddy currents generated in a center portion of the unitary mass 280. In certain such implementations, the sub-masses 342 and the electrically insulative material 344 separating adjacent sub-masses 342 are configured to substantially constrain the areas of the eddy currents flowing in the peripheral portions of the unitary mass 340 while not substantially constraining the areas of the eddy currents flowing in the central portion of the unitary mass 340. For example, as schematically illustrated by FIGS. 4A-4B, the sub-masses 342 of the substantially planar and circular unitary mass 340 can comprise a central sub-mass 342*a* (e.g., having substantially circular disk shape)

and a plurality of peripheral sub-masses 342*b* (e.g., segments of a substantially circular ring) positioned around (e.g., encircling) the central sub-mass 342*a*.

Figure 5A:
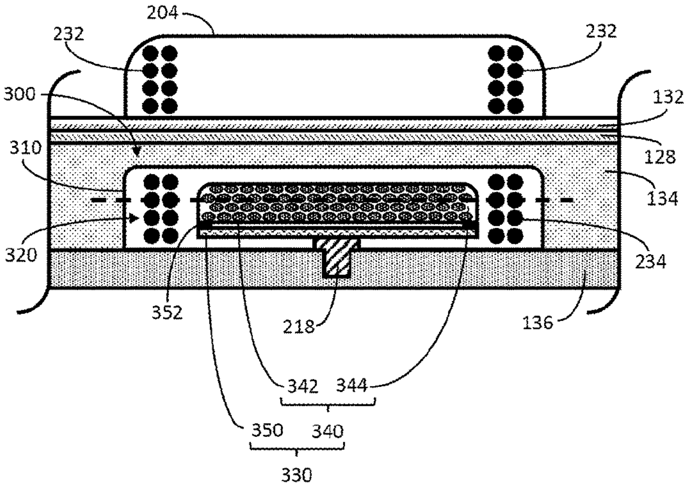
FIGS. 5A-5B schematically illustrate cross-sectional views of a portion of another example apparatus comprising at least one actuator configured to generate vibrations in accordance with certain implementations described herein.
Figure 5B:
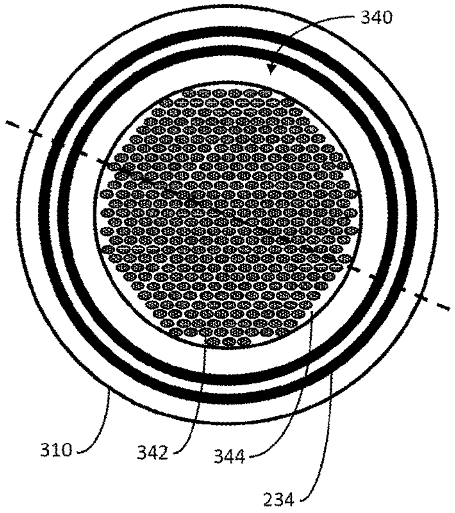

FIGS. 5A-5B schematically illustrate cross-sectional views of a portion of another example apparatus 300 in accordance with certain implementations described herein. The unitary mass 340 of FIGS. 5A-5B comprises a plurality of electrically conductive sub-masses 342 (e.g., metallic particles). For example, the sub-masses 342 can be distributed within a matrix comprising an electrically insulative material 344. For another example, the sub-masses 342 can each have an electrically insulating coating and can be fused together while remaining electrically isolated from one another to form the unitary mass 340. While FIGS. 5A-5B schematically illustrate an implementation in which the sub-masses 342 have substantially the same shape and size as one another and are arranged in a uniform and orderly configuration, in certain other implementations, the sub-masses 342 can have various shapes (e.g., regular; irregular) and/or sizes (e.g., narrow or broad size distribution), and can be uniformly or non-uniformly spatially distributed within the unitary mass 340. By having a substantial fraction of the plurality of sub-masses 342 electrically isolated from one another, certain such implementations reduce (e.g., limit) any electrical eddy currents to be smaller than the sub-masses 342 in which the eddy currents are generated.

Figure 6:
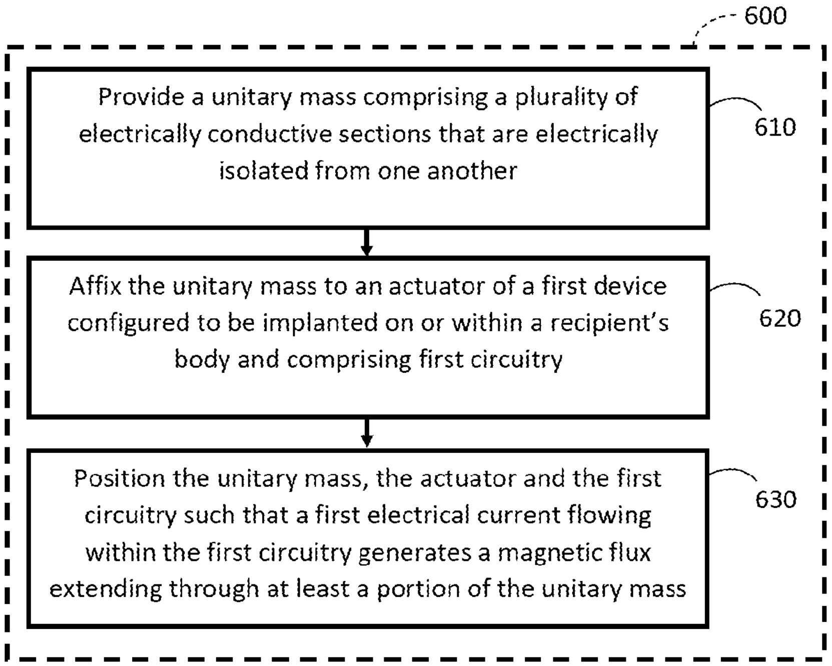
FIG. 6 is a flow diagram of an example method in accordance with certain implementations described herein.

FIG. 6 is a flow diagram of an example method 600 in accordance with certain implementations described herein. In an operational block 610, the method 600 comprises providing a unitary mass comprising a plurality of electrically conductive sections that are electrically isolated from one another. In an operational block 620, the method 600 further comprises affixing the unitary mass to an actuator of a first device configured to be implanted on or within the recipient's body, the first device comprising first circuitry (e.g., communication coil 234) configured to communicate (e.g., transmit and/or receive power and/or information) via a magnetic induction link with second circuitry (e.g., communication coil 232) of a second device configured to be positioned outside the recipient's body. In certain implementations, said affixing the unitary mass to the actuator is performed prior to the first device being implanted on or within the recipient's body (e.g., while the actuator and/or the first circuitry are within the first device or while one or both of the actuator and the first circuitry are outside the first device). In an operational block 630, the method 600 further comprises positioning the unitary mass, the actuator, and the first circuitry such that a first electrical current flowing within the first circuitry generates a magnetic flux configured to magnetically induce a second electrical current to flow within the second circuitry, the magnetic flux extending through at least a portion of the unitary mass. In certain implementations, said positioning is performed prior to the first device being implanted on or within the recipient's body. In certain implementations, during operation of the first device and the second device, the unitary mass mitigates the formation of eddy currents within the unitary mass caused by the magnetic flux which can adversely affect the efficiency of the magnetic induction link.

In certain implementations, an apparatus configured to be implanted beneath a portion of skin of a recipient comprises a second unitary mass (e.g., part of an accelerometer of the apparatus) positioned within the implantable housing of the apparatus and in a region in which magnetic flux from the implantable portion of the apparatus (e.g., communication coil), and/or the external portion of the apparatus (e.g., communication coil) extends through the second unitary mass. In certain such implementations, the second unitary mass can comprise a plurality of electrically conductive sub-masses in mechanical communication with one another and electrically isolated from one another as described herein.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, although the disclosed methods and apparatuses have largely been described in the context of conventional cochlear implants, various implementations described herein can be incorporated in a variety of other suitable devices, methods, and contexts. More generally, as can be appreciated, certain implementations described herein can be used in a variety of implantable medical device contexts that can benefit from having at least a portion of the received power available for use by the implanted device during time periods in which the at least one power storage device of the implanted device unable to provide electrical power for operation of the implantable medical device.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an,"

and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

The invention described and claimed herein is not to be limited in scope by the specific example implementations herein disclosed, since these implementations are intended as illustrations, and not limitations, of several aspects of the invention. Any equivalent implementations are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example implementations disclosed herein, but should be defined only in accordance with the claims and their equivalents.

What is claimed is:

1. An apparatus comprising:
- a housing configured to be implanted beneath a portion of skin of a recipient;
- first circuitry within the housing, the first circuitry configured to wirelessly communicate with second circuitry of an external device positioned on or above the portion of skin; and
- an actuator within the housing and configured to be in mechanical communication with a portion of bone of the recipient, the actuator comprising a unitary mass configured to undergo vibratory motion within the housing, the unitary mass comprising a plurality of electrically conductive sub-masses in mechanical communication with one another and electrically isolated from one another.

2. The apparatus of claim 1, wherein the first circuitry is configured to wirelessly communicate with the second circuitry via a time-varying magnetic flux generated by the first circuitry and/or the second circuitry and extending through the unitary mass.

3. The apparatus of claim 1, wherein the first circuitry comprises at least one first electrically conductive coil at least partially bounding a region containing the unitary mass and configured to be in inductive communication with at least one second electrically conductive coil of the second circuitry.

4. The apparatus of claim 3, wherein the at least one first electrically conductive coil encircles the unitary mass.

5. The apparatus of claim 1, wherein the unitary mass comprises at least one electrically insulative material between adjacent electrically conductive sub-masses of the plurality of electrically conductive sub-masses.

6. The apparatus of claim 1, wherein the unitary mass has a substantially circular disk shape having a width substantially parallel to the recipient's skin and a thickness substantially perpendicular to the width.

7. The apparatus of claim 6, wherein the width is in a range of 15 millimeters to 25 millimeters and the thickness is in a range less than 5 millimeters.

8. The apparatus of claim 6, wherein the plurality of electrically conductive sub-masses comprises a plurality of wedge-shaped or sector-shaped sub-masses.

9. The apparatus of claim 6, wherein the plurality of electrically conductive sub-masses comprises a first electrically conductive sub-mass having a substantially circular disk shape and a plurality of second electrically conductive sub-masses comprising a plurality of segments of a substantially circular ring encircling the first sub-mass.

10. The apparatus of claim 1, wherein the unitary mass comprises an electrically insulating matrix material and at least some of the plurality of electrically conductive sub-masses comprise a plurality of metal particles embedded within the matrix material.

11. The apparatus of claim 1, wherein the apparatus comprises an implantable portion of an auditory prosthesis system and the external device comprises an external portion of the auditory prosthesis system.

12. An assembly comprising:
- an external device configured to be positioned outside a recipient's body, the external device comprising a first communication coil; and
- an implantable device configured to be implanted on or within the recipient's body, the implantable device comprising:
  - a second communication coil in inductive communication with the first communication coil with an inductive link efficiency therebetween; and
  - a monolithic, electrically partitioned mass within a region between the first communication coil and the second communication coil and/or bounded at least in part by the second communication coil, the monolithic, electrically partitioned mass comprising at least one electrically insulating material and a plurality of portions comprising an electrically conductive material, the portions electrically insulated from one another by the at least one electrically insulating material.

13. The assembly of claim 12, wherein a degradation of the inductive link efficiency due to eddy currents generated within the monolithic, electrically partitioned mass by the inductive communication is less than a calculated degradation of the inductive link efficiency due to eddy currents generated by the inductive communication within a monolithic, non-electrically partitioned mass having an identical shape, volume, position, and electrically conductive material as the monolithic, electrically partitioned mass.

14. The assembly of claim 12, wherein the external device comprises a sound processor of an active transcutaneous bone conduction device and the internal device comprises an actuator of the active transcutaneous bone conduction device.

15. The assembly of claim 14, wherein the actuator comprises a piezoelectric actuator comprising the monolithic, electrically partitioned mass.

16. The assembly of claim 12, wherein the internal device comprises an accelerometer comprising the monolithic, electrically partitioned mass.

17. The assembly of claim 12, wherein the first communication coil and the second communication coil are substantially planar and configured to be substantially parallel to and substantially concentric with one another and displaced from one another along a direction substantially perpendicular to the first and second communication coils.

18. A method comprising:

providing a unitary mass comprising a plurality of electrically conductive sections that are electrically isolated from one another;

affixing the unitary mass to an actuator of a first device configured to be implanted on or within a recipient's body, the first device comprising first circuitry configured to communicate via a magnetic induction link with second circuitry of a second device configured to be positioned outside the recipient's body; and positioning the unitary mass, the actuator, and the first circuitry such that a first electrical current flowing within the first circuitry generates a magnetic flux configured to magnetically induce a second electrical current to flow within the second circuitry, the magnetic flux extending through at least a portion of the unitary mass.

19. The method of claim 18, wherein the first circuitry comprises at least one communication coil and the second circuitry comprises at least one communication coil.

20. The method of claim 18, further comprising mitigating formation of eddy currents within the unitary mass caused by the magnetic flux.

* * * * *